UNITED STATES PATENT OFFICE.

WILLIAM J. ARMBRUSTER, OF ST. LOUIS, MISSOURI.

PIGMENT AND PROCESS OF MAKING SAME.

SPECIFICATION forming part of Letters Patent No. 719,415, dated February 3, 1903.

Application filed May 26, 1902. Serial No. 109,091. (No specimens.)

*To all whom it may concern:*

Be it known that I, WILLIAM J. ARMBRUSTER, a citizen of the United States, residing at St. Louis, State of Missouri, have invented certain new and useful Improvements in Pigments and Processes of Making the Same, of which the following is a specification.

My invention has relation to improvements in processes of manufacturing pigments and in the product resulting therefrom; and it consists, respectively, in the novel steps and in the novel product more fully set forth in the specification and pointed out in the claims.

The composition consists of an intimate mixture of precipitated barium sulfate, zinc sulfid, and barium carbonate in various proportions, said proportions depending on the relative proportions of the respective solutions constituting the mixtures from which the salts are precipitated. In the preparation of my compound I employ mixtures of solutions of zinc sulfate, a carbonate of an alkali metal, and barium sulfid, the precipitates being formed in the order of the chemical affinities between the several bases and acids. The proportions in which the several solutions shall be mixed resolve themselves into simple stoicheiometric problems; but the following are cited as specific examples of my process, the product in each case being the same.

I prepare a solution of one molecular equivalent of zinc sulfate, one molecular equivalent of sodium carbonate, and two molecular equivalents of barium sulfid, bringing the several solutions intimately together, when from the resulting mixture there will be precipitated one molecular equivalent of barium sulfate, one molecular equivalent of zinc sulfid, and one molecular equivalent of barium carbonate, leaving one molecular equivalent of sodium sulfid in solution, as better apparent from the following chemical reactions:

$$ZnSO_4 + Na_2CO_3 + 2BaS = BaSO_4 + ZnS + BaCO_3 + Na_2S.$$

It was stated above that the constituent parts of the compound precipitate will be formed in the order of the chemical affinities between the several bases and acids, and since the affinity between barium and sulfuric acid is greater than that between the same base and carbonic acid it follows that one molecular equivalent of barium sulfate and one equivalent of zinc sulfid will be formed simultaneously according to the following reaction:

$$ZnSO_4 + 2BaS = BaSO_4 + ZnS + BaS.$$

The molecule of barium sulfid immediately reacts on the sodium carbonate present, forming the resulting precipitate of barium carbonate and leaving the sodium sulfid in solution, thus:

$$BaS + Na_2CO_3 = BaCO_3 + Na_2S.$$

Of course practically the several precipitates form approximately at one time, though chemically the reactions follow the sequence outlined above.

The foregoing example contemplates a mixture of one molecular equivalent of zinc sulfate, one of sodium carbonate, and two of barium sulfid; but obviously I need not limit myself to these proportions, as these may be departed from without in any wise affecting the nature or spirit of my invention. As an example of such departure I may take one molecular equivalent of zinc sulfate, two equivalents of sodium carbonate, and three equivalents of barium sulfid, thus producing one equivalent of barium sulfate, one equivalent of zinc sulfid, two equivalents of barium carbonate, leaving two equivalents of sodium sulfid in solution, as per following reaction:

$$ZnSO_4 + 2Na_2CO_3 + 3BaS = BaSO_4 + ZnS + 2BaCO_3 + 2Na_2S.$$

As another example of such departure I may mix the equivalents according to the following reaction:

$$2ZnSO_4 + Na_2CO_3 + 3BaS = 2BaSO_4 + 2ZnS + BaCO_3 + Na_2S.$$

While in the foregoing I employ sodium carbonate, it is apparent that I may avail myself of any of its chemical equivalents, such as ammonium carbonate or potassium carbonate, the reactions being in all respects similar to those outlined above. Whatever be the nature of the chemical employed in determining what shall be the relative quantities of the several ingredients to produce the precipitate on a commercial scale the usual stoicheiometric problem presents itself, a problem based on the atomic weights of the several elements composing the molecule by which the reaction is effected. Thus in practice, and referring specifically to the first example above cited, I take an aqueous solution of one hundred and sixty-one (161) pounds of zinc sulfate, one hundred and six (106) pounds of sodium carbonate, and three hundred and thirty-eight (338) pounds of barium sulfid and bring the solutions together in any suitable manner, when a compound precipitate of five hundred and twenty-seven (527) pounds will result and seventy-eight (78) pounds of sodium sulfid will remain in solution. This precipitate will contain two hundred and thirty-three (233) pounds of barium sulfate, ninety-seven (97) pounds of zinc sulfid, and one hundred and ninety-seven (197) pounds of barium carbonate. The sodium-sulfid solution is separated from the precipitate by filtration and subjected to suitable evaporation, which crystallizing with nine molecules of water forms two hundred and forty (240) pounds of sodium-sulfid crystals. The precipitate may be washed before recovery.

I am aware that there is in use a pigment of zinc sulfid and barium sulfate in various proportions known as "lithopone;" but this I do not claim, for while precipitated barium sulfate as a pigment has the virtue of permanency, yet it has no body or opacity when mixed with oil and being almost if not altogether transparent if used alone. Precipitated barium carbonate while also classed as a transparent pigment when used in oil, yet has somewhat more body or opacity in oil than precipitated barium sulfate, is also a very permanent pigment, and has a highly-attractive quality in that it usually forms in a more amorphous or less crystalline body than the sulfate, and, moreover, it is unctuous and smoother. In actual practice it is found that when precipitated barium carbonate is substituted for precipitated barium sulfate, either wholly or in part, when combined with zinc and lead whites the resultant compound pigment works smoother and finer, grinds easier in oil, flows more readily from the brush, and spreads easier under the brush.

As an example of the successive precipitation of the individual products composing the final mixture the following reactions may be cited:

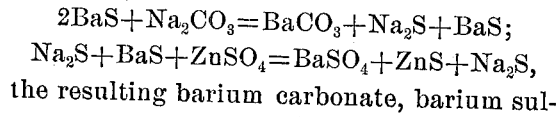

the resulting barium carbonate, barium sulfate, and zinc sulfid being subsequently and intimately mixed by any of the well-known mechanical methods.

Having described my invention, what I claim is—

1. The process of making pigment consisting of mixing solutions of zinc sulfate, a carbonate of an alkali metal, and barium sulfid, and recovering the resulting precipitates, substantially as set forth.

2. The process of making pigment consisting of mixing solutions of zinc sulfate, sodium carbonate and barium sulfid, and recovering the resulting precipitates, substantially as set forth.

3. The process of making pigment which consists in mixing solutions of molecular equivalents of zinc sulfate, a carbonate of an alkali metal, and barium sulfid, and recovering the resulting precipitates, substantially as set forth.

4. The process of making pigment which consists in mixing solutions of molecular equivalents of zinc sulfate, sodium carbonate, and barium sulfid, and recovering the resulting precipitates, substantially as set forth.

5. The process of making pigment which consists in mixing solutions of approximately one hundred and sixty-one pounds of zinc sulfate, one hundred and six pounds of sodium carbonate, and three hundred and thirty-eight pounds of barium sulfid, and recovering the resulting precipitates, substantially as set forth.

6. A pigment composed of a mixture of barium sulfate, zinc sulfid and barium carbonate, in substantially the proportions specified.

7. A pigment composed of a precipitate of barium sulfate, zinc sulfid, and barium carbonate, in substantially the proportions specified.

8. A pigment composed of precipitated barium sulfate and zinc sulfid, intimately mixed with a precipitate of barium carbonate, substantially as set forth.

9. A pigment comprising a mixture of the precipitates of two hundred and thirty-three parts by weight of barium sulfate, ninety-seven parts of zinc sulfid, and one hundred and ninety-seven parts of barium carbonate, substantially as set forth.

In testimony whereof I affix my signature in presence of two witnesses.

WILLIAM J. ARMBRUSTER.

Witnesses:
 EMIL STAREK,
 G. L. BELFRY.